Sept. 29, 1925. 1,555,231
M. S. SKAER
PROCESS AND APPARATUS FOR SEPARATING WATER AND IMPURITIES
FROM HYDROCARBONS, SOAPS, FATS, AND THE LIKE
Filed Jan. 23, 1925   2 Sheets-Sheet 2
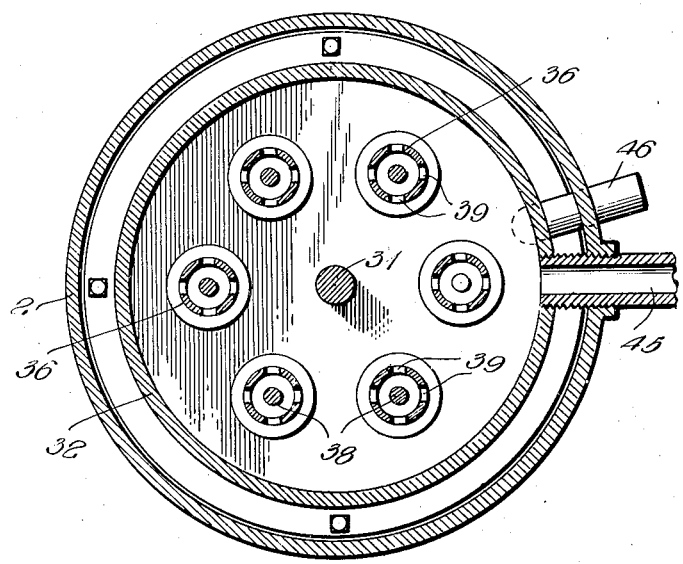
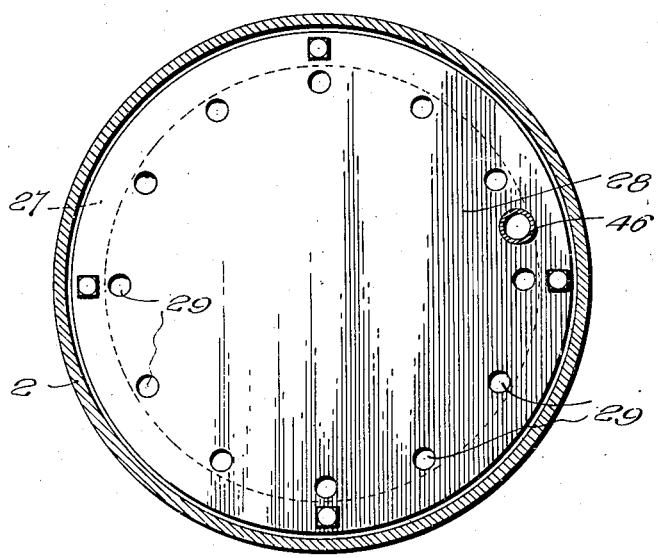
Inventor
Moyle S. Skaer
By H. B. Wilson & Co.
Attorneys
Witness Patented Sept. 29, 1925.

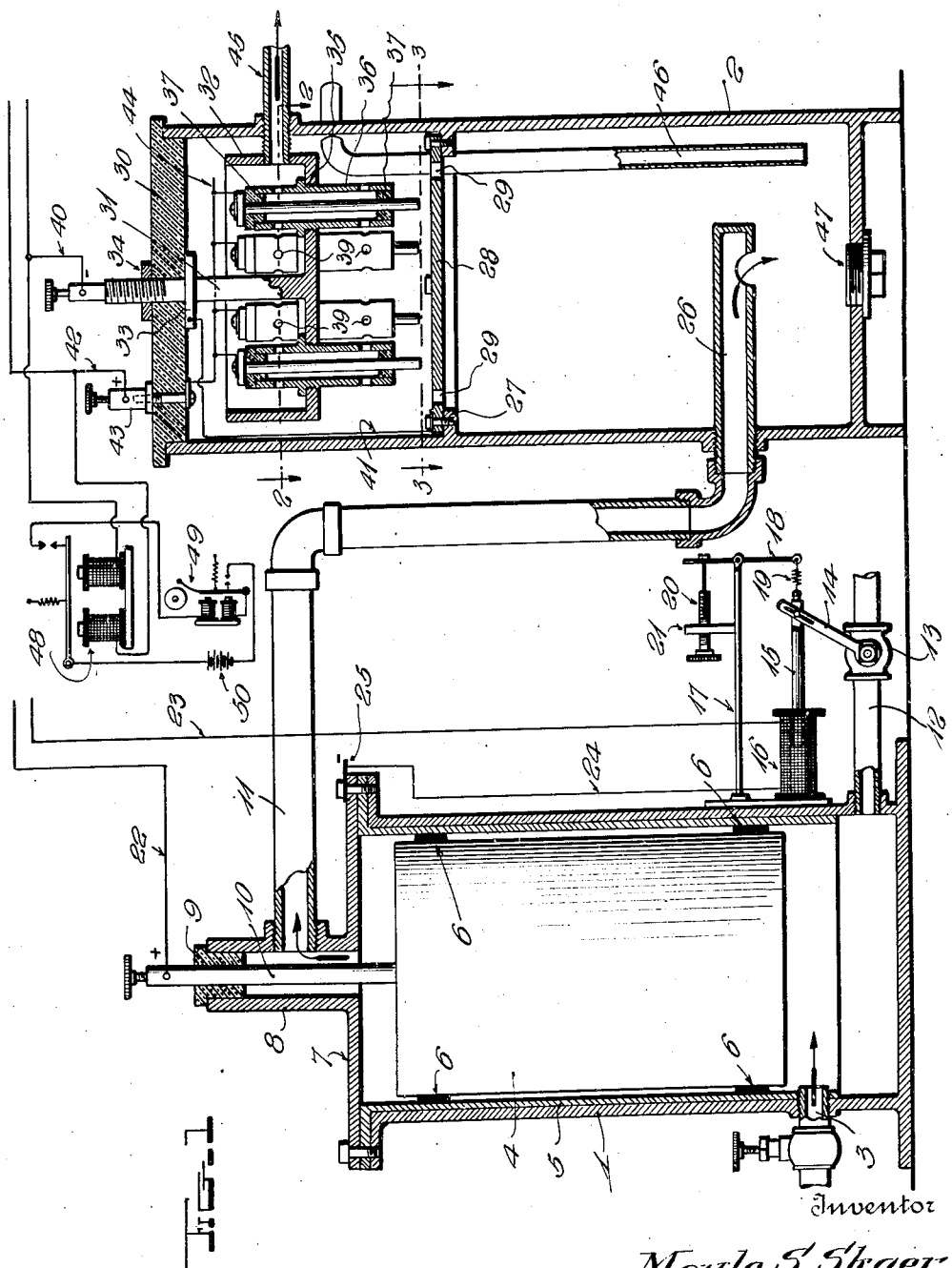

1,555,231

UNITED STATES PATENT OFFICE.

MOYLE S. SKAER, OF AUGUSTA, KANSAS.

PROCESS AND APPARATUS FOR SEPARATING WATER AND IMPURITIES FROM HYDRO-CARBONS, SOAPS, FATS, AND THE LIKE.

Application filed January 23, 1925. Serial No. 4,213.

*To all whom it may concern:*

Be it known that I, MOYLE S. SKAER, a citizen of the United States, residing at Augusta, in the county of Butler and State of Kansas, have invented certain new and useful Improvements in a Process and Apparatus for Separating Water and Impurities from Hydrocarbons, Soaps, Fats, and the like; and I do declare the following to be a full, clear, and exact description of the invention, such as will enable others skilled in the art to which it appertains to make and use the same.

The present invention falls within the art of dehydrating and purifying oily substances, and while it may be used effectively for treating hydrocarbons, soaps, fats and similar compounds, it is especially valuable in separating salt water and impurities from petroleum.

Petroleum oil as found in nature is often in the form of an emulsion composed of petroleum and salt water as well as other impurities such as hydrogen sulphide and phenols; and while methods and apparatus have been suggested for obtaining the petroleum from such emulsion, they have not proved economical, so that the emulsions have in most cases been considered the same as waste and disposed of accordingly. This, however, will no longer be necessary, as the present invention provides for a speedy, effective and economical breaking up of the emulsions, resulting in an extraction of the petroleum therefrom.

According to the invention, the emulsion, which as explained above contains salt, is put through an electro-chemical process, or in other words, is subjected to electrolysis. Under this treatment sodium hydroxide is formed, and this substance unites or re-acts with the hydrogen sulphide and phenols, forming gases which are allowed to pass off leaving dehydrated and purified petroleum.

A better understanding of the invention may be obtained by a consideration of the following detailed description, taken in connection with the accompanying drawings, which illustrate a novel apparatus capable of being used in carrying out the novel process. While some of the salient features of this apparatus are necessary for effectively carrying out the process, others are not, so that the apparatus may be changed or modified as conditions or occasions demand.

In the above referred to drawings:—

Figure 1 is a vertical longitudinal sectional view of the apparatus; and

Figures 2 and 3 are horizontal sectional views of one of the tanks, taken respectively on the lines 2—2 and 3—3 of Fig. 1.

The emulsified petroleum or substance to be dehydrated and purified is subjected to electrolysis one or more times in one or more tanks. In may cases, two of these electrolytic treatments may be necessary, as well as sufficient, and this is preferably done by the use of two tanks, such as represented by the numerals 1 and 2 in the drawings. The emulsion to be treated is pumped or otherwise continuously fed into the first tank 1 through a pipe 3 leading into the lower part thereof. It then passes upwardly through the tank between two electrodes 4 and 5. The electrode 4, which by preference is the positive electrode, is in the form of a solid or closed ended cylinder, and the electrode 5 which would be the negative electrode surrounds the electrode 4 and forms a lining for a portion of the tank 1. The two electrodes 4 and 5 are maintained in proper spaced relation by any suitable means, such as the insulating spacing elements 6.

The intention is to supply an electric current to the electrodes while the emulsion passes upwardly between them. This causes a decomposition of the emulsion and while the chemical re-action will be hereinafter explained in detail, for the present it will suffice to point out that the electrolytic action of the electric current causes the water and impurities contained in the emulsion to separate from the petroleum and pass to the lower part of the tank 1, while the petroleum continues to flow upwardly.

The top of the tank 1 is closed by a cover 7, the central portion of which is provided with a tubular neck 8. An apertured cap 9 is fitted in the upper end of the neck 8, and a rod 10 extending upwardly from the electrode 4 passes through the aperture in the cap 9 and is provided at its upper end with means by which a conductor wire may be connected to the same. The rod 10 is of smaller diameter than the bore of the neck 8 and is located centrally within the bore, so that the petroleum which emerges from between the two electrodes 4 and 5 passes upwardly through the neck 8 into a pipe 11 which leads from one side of the neck.

The water and impurities which settle to the bottom of the tank are allowed to pass off through a pipe 12. In this pipe there is arranged a valve 13, the stem of which carries an arm 14, which is coupled to the outer end of the slidable core 15 of a solenoid 16. The solenoid 16 is preferably fastened in any suitable manner to one side of the tank 1, and there is also fastened to the tank a bracket 17, to the free end of which is pivoted a lever 18. The lower end of this lever is arranged in alinement with the core 15 and is connected to the outer end of the latter by means of a spring 19. The spring 19 is provided so as to return the core 15 to its normal position, that is, projecting a considerable distance out of the solenoid when the latter is not energized. In order to adjust the tension of the spring 19, the upper end of the lever 18 is coupled to a screw 20, which is threaded through an upwardly projecting lug 21 carried by the bracket 17.

While the apparatus may be used either with direct or alternating current, the drawings illustrate the manner in which the conductors are arranged for direct current, so that 22 represents a conductor which conveys the current to the rod 10 from the positive side of the source of direct current. The conductor 23 which leads from the negative side of the source of current is connected to one terminal of the solenoid 16. The other terminal of the solenoid 16 is connected by a conductor 24 to a lug 25 which has electrical connection with the negative electrode 5. Since the closure 7 for the tank is preferably constructed of conducting material and is not insulated from the electrode 5, the cap or plug 9 with which the neck 8 is provided, is preferably made of insulating material.

When a certain amount of salt water and impurities are contained in the emulsion, it causes a strong current to flow through the solenoid 16, energizing the latter and drawing the core 15 inwardly. The inward movement of the core 15 swings the arm 14 and opens the valve 13 to permit the water and impurities to pass out of the tank 1 through the pipe 3. As soon as these substances have passed off, so that only the petroleum oil remains in the tank 1, the solenoid 16 will become de-energized, and the spring 19 will withdraw the core 15 and swing the arm 14 to close the valve 13.

The second tank 2 in which the emulsified petroleum is subjected to electrolysis, has an inlet 26 in its lower part for the petroleum or emulsified oil. This inlet is of course connected by suitable fittings to the pipe 11 which leads from the first tank 1. After being discharged into the tank 2, the emulsion passes upwardly. Formed on the inside of the tank 2 at a point approximately midway of its ends, is an annular ledge 27, to which is screwed or otherwise suitably secured a plate 28. This plate, which constitutes an electrode member, is apertured to permit the emulsion to pass therethrough from the lower portion of the tank to the upper portion thereof, the apertures 29 being preferably arranged in a circular series adjacent its outer edge and the inner edge of the ledge 27.

The upper end of the tank 2 is closed by a closure 30 and inasmuch as this constitutes a support for certain of the electrode members, it is preferably constructed of insulating material. It is provided with a central aperture, through which the stem 31 of a pan or well 32 passes. The stem is provided with a flange 36 arranged to bear against the lower side of the closure 30, and its upper end is threaded to receive a nut member 34 to bear against the upper side of the cover. In this way, the stem 31 is clamped or secured to the cover 30 and supports the pan or well 32 between the cover and the aforesaid plate 28 and in spaced relation from the wall of the tank 2. The bottom of the pan or well 32 is provided with a plurality of openings 35. These are arranged in a circular series about the stem 31 and are internally threaded to receive the externally threaded portions of a plurality of tubular negative electrode members 36. The members 36 extend both above and below the bottom of the pan or well 32, and their ends are fitted with plugs 37 of insulating material. These plugs are centrally apertured to receive rods 38 which constitute the positive electrodes of the device. In order that the emulsion can pass between the positive and negative electrodes, the tubular negative electrodes 36 are provided at their upper and lower end portions with apertures 39. It will be noted, however, that the lower ends of the positive electrodes 38 project below the lower ends of the tubular negative electrodes 36, and inasmuch as the plate 28 forms one of the negative electrodes, electrolytic action will take place between the plate 28 and the lower ends of the rods 38.

To electrically connect the second tank 2 with the source of electric current, a lead 40 from the negative side of the source is connected to the upper end of the aforesaid stem 31. Since this stem is constructed of conducting material, it will conduct the current to the bottom of the pan 32, through which it will be conducted to the tubular negative electrodes 36. Electric connection between the stem 31 and the plate 28 is established by means of a conductor 41 which is here shown leading from the flange 33 to one of the screws by which the plate 28 is secured to the ledge 27. The lead 42 from the positive side of the source of current is connected to a binding post 43 mounted upon the insulating cover or closure 30 of the tank 2. A portion of this binding post extends to the inside of the tank, and from this portion leads a conductor 44, which is connected to each of the positive electrodes 38.

As briefly explained in connection with the first tank 1, the emulsion as it passes upwardly through the tank 2 is subjected to the electrolytic action of an electric current. This decomposes the emulsion, separating the water and impurities from the petroleum. The complete separation of the petroleum takes place in the pan 32, so that the petroleum is allowed to pass out of the pan and out of the tank through the discharge pipe 45. As the emulsion becomes decomposed and the water and impurties separate, these substances pass downwardly into the lower portion of the tank 2, where they are drawn off through the pipe 46. Any sediment which may collect in the bottom of the tank may be removed through the hole which is ordinarily closed by means of a plug 47.

An electric relay 48 is shunted across the leads 40 and 42 from the main circuit line or source of current, so that when no current is flowing into the tank 2, the relay will operate to ring an electric bell 49 which is supplied with current by means of a few dry cells 50, the purpose of the bell being to indicate when the pump feeding the emulsion into the apparatus should be stopped.

The electro-chemical actions which are set up in the tanks 1 and 2 are the same for both tanks and will now be explained. The electric current will not flow between the positive and negative electrodes when the petroleum contains no conductive substances such as salt water and impurities, but when the oil contains such substances the current will flow from the positive electrodes to the negative electrodes. The flow of electric current produces electrolytic action upon the salt water, and liberates chlorine and hydrogen which pass off as gases, but the sodium reacts with the water and forms sodium hydroxide. The sodium hydroxide which is made as long as electric current flows, coagulates particles of water and impurities that are in the emulsion and frees the petroleum. Heat, of course, is produced by the re-action, and this assists in the separation of the emulsion.

From the foregoing description, taken in connection with the accompanying drawings, the invention will be so understood by those skilled in the art to which it appertains to enable them to make use of the same, so that further explanation is believed to be unnecessary.

While the invention is primarily intended for separating salt water, hydrogen sulphide, phenols and other impurities from petroleum, it may be effectively used in dehydrating and purifying other oily substances, so that no limitation in the use of the invention is intended.

The apparatus disclosed is merely an example of what may be used in carrying out the process, so that it may be changed or modified to suit particular conditions.

Having fully described the nature of the invention, what is believed to be the novelty contained therein is defined by the following claims.

I claim:

1. An apparatus of the class described comprising a closed tank provided at its bottom portion with an inlet, a pan supported in upright position within said tank above said inlet and provided at its bottom with a series of apertures, tubular electrodes fitted in said apertures, electrode rods extending through said tubular electrodes, a pipe extending from said pan to the outside of said tank, another pipe leading from the bottom portion of said tank to the outside of the same, and conductors for supplying electric current to said tubular electrodes and said electrode rods.

2. A structure as specified in claim 1, and in addition thereto an apertured electrode plate supported in said tank beneath said pan adjacent the lower ends of the electrode rods.

In testimony whereof I have hereunto affixed my signature.

MOYLE S. SKAER.